(12) United States Patent
Lim et al.

(10) Patent No.: US 10,138,890 B2
(45) Date of Patent: Nov. 27, 2018

(54) ELECTRIC COMPRESSOR AND METHOD OF FORMING OIL SEPARATOR OF ELECTRIC COMPRESSOR

(71) Applicant: Hanon Systems, Daejeon (KR)

(72) Inventors: Jae Hoon Lim, Daejeon (KR); Hong Min Kim, Daejeon (KR); Kweon Soo Lim, Daejeon (KR); Soo Cheol Jeong, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 14/911,470

(22) PCT Filed: Jun. 19, 2015

(86) PCT No.: PCT/KR2015/006242
§ 371 (c)(1),
(2) Date: Feb. 11, 2016

(87) PCT Pub. No.: WO2016/143950
PCT Pub. Date: Sep. 15, 2016

(65) Prior Publication Data
US 2018/0187683 A1    Jul. 5, 2018

(30) Foreign Application Priority Data

Mar. 6, 2015    (KR) .................. 10-2015-0031825

(51) Int. Cl.
*B01D 50/00*    (2006.01)
*F04C 29/02*    (2006.01)
(Continued)

(52) U.S. Cl.
CPC ........ *F04C 29/026* (2013.01); *B01D 21/0012* (2013.01); *B01D 45/08* (2013.01);
(Continued)

(58) Field of Classification Search
CPC  F04C 29/026; F04C 18/0215; F04C 29/0085; B01D 21/0012; B01D 45/16;
(Continued)

(56) References Cited

U.S. PATENT DOCUMENTS 2,662,610 A * 12/1953 Heinrich .................. B04C 3/04
55/347
3,480,330 A * 11/1969 Hirs ................... B01D 46/0002
118/312

(Continued)

FOREIGN PATENT DOCUMENTS

EP    1696126 A1    8/2006
JP    2005180345 A    7/2005
(Continued)

*Primary Examiner* — Dung H Bui
(74) *Attorney, Agent, or Firm* — Shumaker, Loop & Kendrick, LLP; James D. Miller

(57) ABSTRACT

Disclosed herein is an electric compressor. The electric compressor includes: a housing (100) which has a discharge chamber (102) through which refrigerant is discharged; and an oil separator (200) which is disposed in the discharge chamber (102), and includes a refrigerant inlet hole (201) through which refrigerant is drawn into the oil separator (200), and a foreign substance storage part (210) storing therein foreign substances contained in the refrigerant drawn through the refrigerant inlet hole (201).

16 Claims, 13 Drawing Sheets

(51) Int. Cl.
- *B01D 45/16* (2006.01)
- *B01D 45/08* (2006.01)
- *F04C 18/02* (2006.01)
- *B01D 21/00* (2006.01)
- *F04C 29/00* (2006.01)
- *A47L 9/16* (2006.01)

(52) U.S. Cl.
CPC .......... *B01D 45/16* (2013.01); *F04C 18/0215* (2013.01); *F04C 29/0085* (2013.01); *A47L 9/165* (2013.01); *A47L 9/1666* (2013.01); *A47L 9/1683* (2013.01)

(58) Field of Classification Search
CPC ....... B01D 45/08; A47L 9/1683; A47L 9/165; A47L 9/1666
See application file for complete search history.

(56) References Cited

U.S. PATENT DOCUMENTS

| | | | | |
|---|---|---|---|---|
| 4,203,737 A * | 5/1980 | Margraf | ................ | B01D 46/02 55/283 |
| 4,681,607 A * | 7/1987 | Bollerhey | ............ | B01D 50/002 55/284 |
| 4,687,497 A * | 8/1987 | Owen | .................... | B01D 45/12 422/147 |
| 4,695,299 A * | 9/1987 | Spadaro | ................. | B01D 46/12 55/315 |
| 5,236,479 A * | 8/1993 | Billingsley | ............ | B01D 45/12 55/337 |
| 6,080,217 A * | 6/2000 | Gobl | ........................ | B04C 5/08 55/283 |
| 6,383,263 B1 * | 5/2002 | Dullien | ................ | B01D 50/002 164/5 |
| 6,716,261 B2 * | 4/2004 | Carroll | ................ | B01D 50/002 55/337 |
| 2005/0135956 A1 | 6/2005 | Kimura et al. | | |
| 2006/0171832 A1 * | 8/2006 | Oiwake | ................ | F04B 27/109 418/55.6 |
| 2008/0226483 A1 * | 9/2008 | Iwanami | ................. | F01C 21/10 418/97 |
| 2009/0304539 A1 | 12/2009 | Kii et al. | | |
| 2014/0090560 A1 * | 4/2014 | Buzanowski | ........ | B01D 46/103 95/287 |
| 2014/0216333 A1 * | 8/2014 | Hoversten | ............ | B05B 16/405 118/308 |
| 2015/0033685 A1 * | 2/2015 | Sugio | ..................... | B01D 45/08 55/429 |

FOREIGN PATENT DOCUMENTS

| | | |
|---|---|---|
| JP | 2006207494 A | 8/2006 |
| JP | 2008014174 A | 1/2008 |
| JP | 2010014108 A | 1/2010 |
| JP | 2013204568 A | 10/2013 |
| JP | 2014020306 A | 2/2014 |
| KR | 20110138990 A | 12/2011 |
| KR | 101129537 B1 | 3/2012 |
| KR | 20130126837 A | 11/2013 |
| KR | 20130111381 A | 12/2013 |
| WO | 2012138101 A2 | 10/2012 |

* cited by examiner

ELECTRIC COMPRESSOR AND METHOD OF FORMING OIL SEPARATOR OF ELECTRIC COMPRESSOR

CROSS-REFERENCE TO RELATED APPLICATIONS

This patent application is a United States national phase patent application based on PCT/KR2015/006242 filed Jun. 19, 2015 which claims the benefit of Korean Patent Application No. 10-2015-0031825 filed Mar. 6, 2015. The entire disclosures of the above patent applications are hereby incorporated herein by reference.

FIELD OF THE INVENTION

Exemplary embodiments of the present invention relates to a technique for reliably collecting foreign substances contained in oil separated by an oil separator of a rear housing, and more particularly, to an electric compressor in which a separate storage region for collecting foreign substances is formed in a lower end of an oil separator so that foreign substances can be independently separated from oil, and a method of machining the oil separator of the electric compressor.

BACKGROUND OF THE INVENTION

Generally, a compressor used for air conditioning systems receives, from an evaporator, refrigerant that has passed through an evaporating process, converts the refrigerant into a high-temperature and high-pressure phase in which it can be easily liquefied, and then transfers it to a condenser. As such, the compressor is operated to compress refrigerant that is transferred via the evaporator.

Compressors are classified into a reciprocating compressor in which a drive unit for compressing refrigerant reciprocates to perform the compression operation, and a rotary compressor in which a drive unit rotates to perform the compression operation. Reciprocating compressors are classified into a crank type in which drive force of the drive unit is transmitted to a plurality of pistons through a crank, a swash plate type in which the drive force is transmitted to a rotating shaft provided with a swash plate, and a wobble plate type in which a wobble plate is used.

In such compressors, refrigerant and oil are mixed with each other during use, and the mixture is separated into pure gas phase refrigerant and oil by an oil separator. The refrigerant is moved to an evaporator, and the oil is reused for lubrication in a compressor.

At an initial stage of the operation of the compressor, a small amount of metal foreign substances may be generated by friction between components of the compressor. If foreign substances are applied to components of the compressor in which friction is generated, unnecessary abrasion or noise may be caused. Consequently, a technique capable of separating foreign substances from oil has been required.

SUMMARY OF THE INVENTION

Embodiments of the present invention relate to an electric compressor which is configured such that foreign substances can be reliably separated from oil in a lower end of an oil separator provided in the electric compressor, and a method of forming the oil separator of the electric compressor.

Technical Solution

An electric compressor in accordance with a first embodiment of the present invention may include a housing (100) having a discharge chamber (102) through which refrigerant is discharged; and an oil separator (200) disposed in the discharge chamber (102), and including a refrigerant inlet hole (201) through which refrigerant is drawn into the oil separator (200), a foreign substance storage part (210) storing therein foreign substances contained in the refrigerant drawn through the refrigerant inlet hole (201), and a discharge hole through which oil separated from the refrigerant is discharged, wherein the foreign substance storage part (210) is disposed at a position lower than the discharge hole.

The foreign substance storage part (210) may be disposed in a lower end of the oil separator (200) and formed in either a conical or rectangular cross-section shape.

When a radius of the rear housing (100) is R, the foreign substance storage part (210) may be disposed at a position spaced apart from an upper end of the oil separator (200) by ⅔*R or more.

The foreign substance storage part (210) may be reduced in diameter downward.

The surface roughness of an inner circumferential surface of a section in which the foreign substance storage part (210) may be disposed is maintained higher than that of a section from an inside of the refrigerant inlet hole (201) to the foreign substance storage part (210).

The electric compressor may further include a filter unit (300) disposed in a space exterior to an oil separator housing of the oil separator (200) and configured to filter out foreign substances from the refrigerant, wherein the foreign substance storage part (210) may be disposed lower than the filter unit (300).

The oil separator (200) may further include an opening (202) formed to allow oil, which exceeds a storage capacity of the foreign substance storage part (210) and overflows, to move to the filter unit (300). The opening (202) may extend to be inclined upward from an inside of the oil separator (200) toward an outside.

The filter unit (300) may be formed to be inclined relative to the rear housing (100).

The filter unit (300) may include: a filter body (310) disposed adjacent to the opening (202); and a flow passage part (320) guiding movement of oil that has passed through the filter body (310), with a discharge hole (322) formed in an end of the flow passage part (320).

The filter body (310) may be disposed below the flow passage part (320).

A plurality of foreign substance storage parts (210) may be formed with different areas in the oil separator (200).

The foreign substance storage part (210) may include: a first foreign substance storage part (212a) formed in a lower end of the oil separator (200); and a second foreign substance storage part (214a) which is open downward on a bottom of the first foreign substance storage part (212a).

The second foreign substance storage part (214a) may comprise a plurality of foreign substance storage parts (214a) which are circumferentially arranged around a center of the bottom of the first foreign substance storage part (212a).

The second foreign substance storage part (214a) may be open with a smaller diameter than the first foreign substance storage part (212a).

The second foreign substance storage part (214a) may extend longer than the first foreign substance storage part (212a).

The first foreign substance storage part (212a) may be reduced in diameter toward the second foreign substance storage part (214a).

When a storage region defined in the first foreign substance storage part (212a) refers to a first storage region (S1) while a storage region defined in the second foreign substance storage part (214a) refers to a second storage region (S2), the first storage region (S1) may be larger than the second storage region (S2).

A method of forming an oil separator of an electric compressor in accordance with a second embodiment of the present invention may include: an operation (S10) of forming a hole for the oil separator after moving a machine tool to a position at which the oil separator is formed in a rear housing (100) supported on a support jig; and an operation (S20) of forming, after the forming of the hole for oil separator has been completed, a foreign substance separation region or foreign substance storage part for collecting foreign substances in a lower end of the oil separator.

The operation (S10) of forming the hole and the operation (S20) of forming the foreign substance separation region may be simultaneously performed by the machine tool.

The operation (S10) of forming the hole may include an operation of forming the hole to a first machine depth using a first machine tool, and the operation (S20) of forming the foreign substance separation region may include an operation (S22) of forming, using a second machine tool, the foreign substance separation region to a second machining depth in a lower end of the hole formed to the first machining depth, wherein the hole formed to the first machining depth and the foreign substance separation region formed to the second machining depth may be respectively formed by different machine tools.

Advantageous Effects

In exemplary embodiments of the present invention, only foreign substances contained in oil separated in an oil separator can be collected and prevented from recirculating. Thereby, generation of noise due to abrasion and friction of components provided in the electric compressor can be prevented, and the efficiency of the electric compressor can be enhanced.

In exemplary embodiments of the present invention, a region in which foreign substances are separated from oil is sectioned into portions having different areas, whereby a phenomenon in which collected foreign substances move to a filter unit can be minimized. Consequently, circulation of oil can be reliably maintained while circulation of foreign substances can be blocked.

DETAILED DESCRIPTION OF EXEMPLARY EMBODIMENTS OF THE INVENTION

Hereinafter, an electric compressor according to an embodiment of the present invention will be described with reference to the attached drawings.

Figure 1:
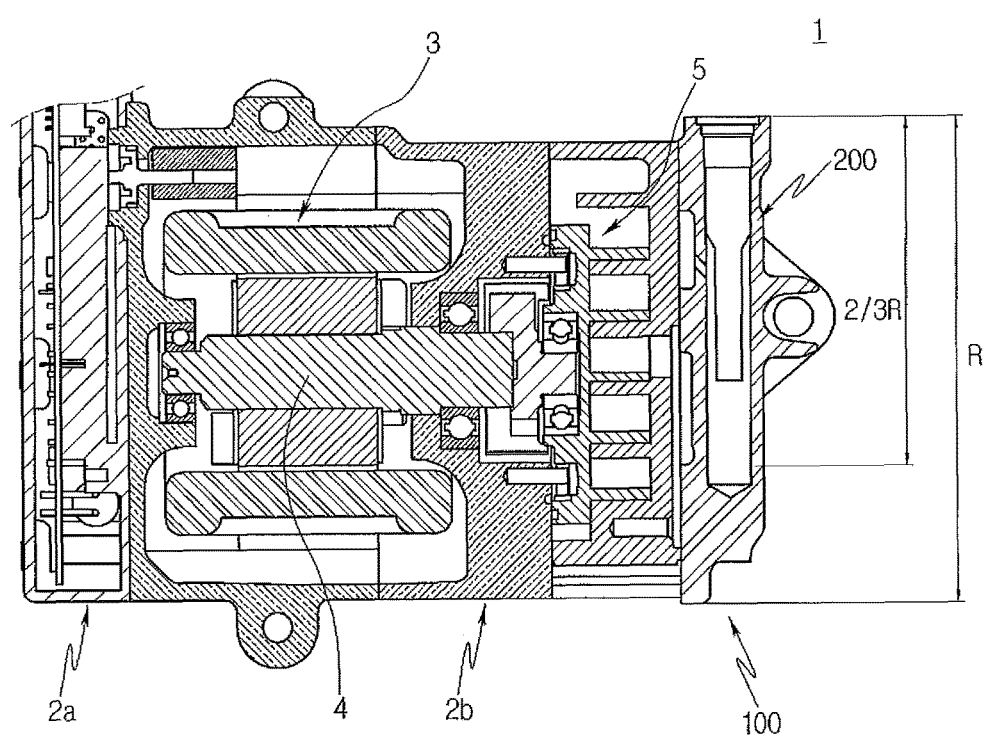
FIG. 1 is a longitudinal sectional view illustrating an electric compressor according to a first embodiment of the present invention.
Figure 2:
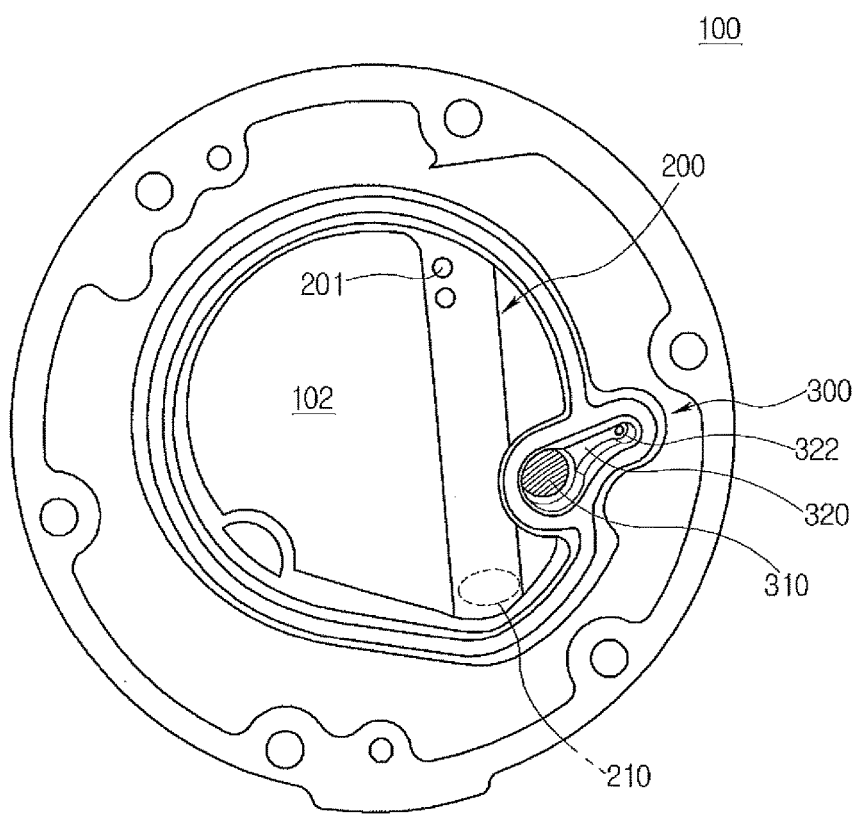
FIG. 2 is a view illustrating an oil separator provided in a rear housing according to the first embodiment of the present invention.
Figure 3:
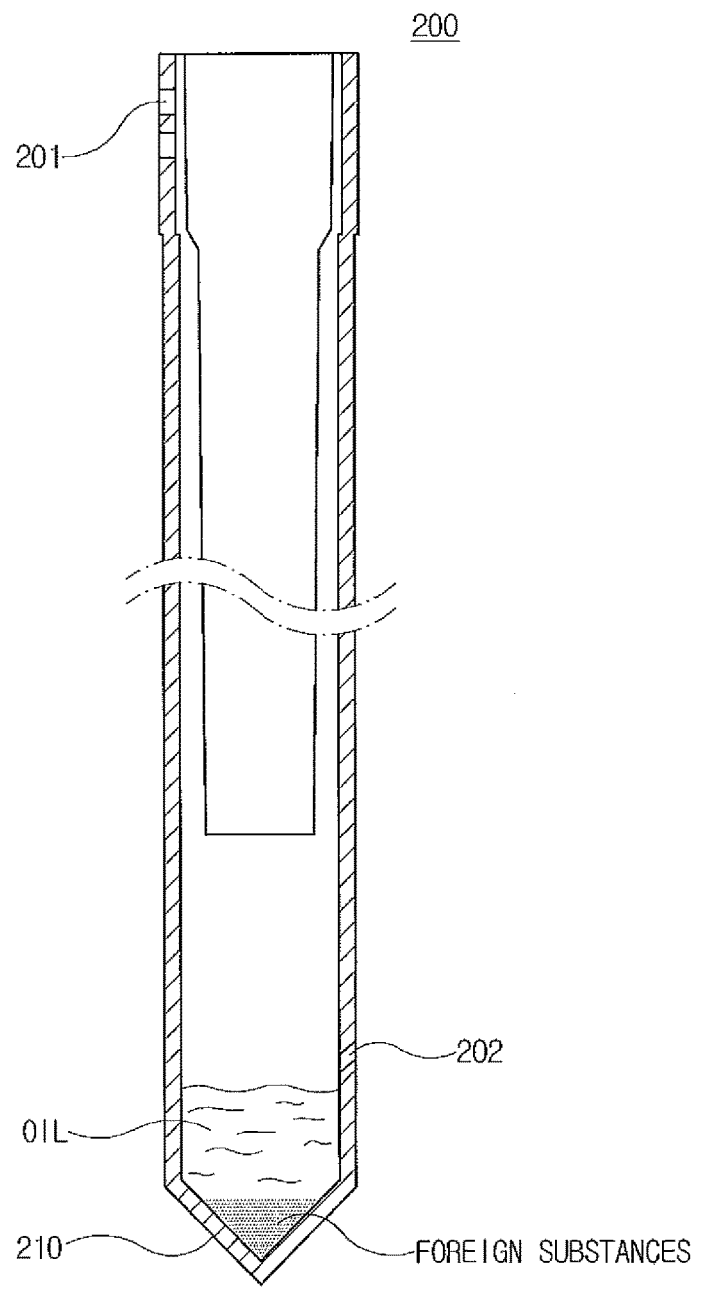
FIG. 3 is a longitudinal sectional view of the oil separator having a foreign substance storage part according to the first embodiment of the present invention.

For reference, FIG. 1 is a longitudinal sectional view illustrating an electric compressor according to a first embodiment of the present invention. FIG. 2 is a view illustrating an oil separator provided in a rear housing according to the first embodiment of the present invention. FIG. 3 is a longitudinal sectional view of the oil separator having a foreign substance storage part according to the first embodiment of the present invention.

Referring to FIGS. 1 to 3, an electric compressor 1 according to the first embodiment of the present invention includes: a rear housing 100 having a discharge chamber 102 through which refrigerant is discharged; and an oil separator 200 which is disposed in the discharge chamber 102 and has a refrigerant inlet hole 201 through which refrigerant is drawn into the oil separator 200, and a foreign substance storage part 210 which stores therein foreign substances contained in the refrigerant drawn through the refrigerant inlet hole 201. The electric compressor 1 is configured to prevent foreign substances from being drawn into a drive unit of the electric compressor 1 using the foreign substance storage part 210 which is formed in the oil separator 200 provided in the rear housing 100 and has a region for collecting foreign substances from refrigerant.

Furthermore, the electric compressor 1 according to the first embodiment of the present invention includes a front housing 2a which is formed adjacent to an inlet port through which refrigerant is drawn in the electric compressor 1, an intermediate housing 2b, and the rear housing 100. The front housing 2a, the intermediate housing 2b, and the rear housing 100 form the appearance of the electric compressor 1. A drive unit 3 and a compression unit 5 are installed in the intermediate housing 2b. The drive unit 3 includes a stator, a rotor, and a rotating shaft 4 which is disposed in a central portion of the rotor.

Rotating force generated from the drive unit 3 is transmitted to the compression unit 5 so as to compress and discharge refrigerant. The compression unit 5 includes a fixed scroll and a turning scroll. The fixed scroll is maintained in a fixed state. The turning scroll is installed so as to be eccentrically rotatable relative to the fixed scroll and configured to compress refrigerant while moving relative to the fixed scroll.

The rear housing 100 is disposed on one end of the intermediate housing 2b. In more detail, the rear housing 100 is brought into close contact with a right end (based on the drawing) of the intermediate housing 2b and is selectively removably mounted to the intermediate housing 2b. Refrigerant discharged from the compression unit 5 passes through a back pressure chamber and is discharged at a predetermined pressure toward the discharge chamber 102 through a discharge hole (not show) before being moved to the refrigerant inlet hole 201 formed in the oil separator 200.

The refrigerant may include a pure gas phase refrigerant, oil, and fine powder or piece-type foreign substances. Oil included in the refrigerant is separated from the refrigerant gas by the oil separator 200. Foreign substances included in the oil are moved along with the oil to a lower portion of the oil separator 200.

The foreign substances are formed of metal or non-metal material. After the electric compressor 1 has been manufactured, a fine amount of foreign substances are generated at an initial operation stage by friction or abrasion between components included in the electric compressor 1. Given this, a structure, in which a separate storage region for collecting foreign substances is formed in order to prevent such foreign substances from continuously circulating in the electric compressor 1 and causing abrasion of the components due to relative movement or rotation, is advantageous for the reliable operation of the electric compressor 1.

In the oil separator 200, the foreign substance storage part 210 is formed in the lower end of the oil separator 200 so that foreign substances can be separated from oil. Foreign substances contained in oil can be moved into the region of the foreign substance storage part 210 due to a difference in specific gravity between them and the oil.

Foreign substances that has been moved into the foreign substance storage part 210 is located in the foreign substance storage part 210 in a lump form, rather than being in an individually scattered state, due to a difference in specific gravity as described above.

When the foreign substances are not moved to an upper portion of the oil separator 200 with respect to the longitudinal direction thereof but remain the region defined by the foreign substance storage part 210, the above-mentioned recirculation of the foreign substances to the drive unit 3 can be prevented, whereby the reliable operation of the electric compressor 1 is ensured, and deterioration in operation efficiency thereof can be prevented.

A filter unit 300 includes a filter body 310 which is disposed adjacent to an opening 202, and a flow passage part 320 which guides movement of oil that has passed through the filter body 310, and which is formed with a discharge hole 322 in an end thereof. As shown in the drawing, the filter unit 300 is disposed in such a way that the filter body 310 faces the foreign substance storage part 210, and the discharge hole 322 is disposed above the filter body 310 at a position relatively far away from the foreign substance storage part 210.

The filter body 310 employs a mesh net (not shown) with a predetermined mesh size so as to secondarily filter out foreign substances from oil. Foreign substances stored in the foreign substance storage part 210 are filtered out again by the mesh net and thus more reliably prevented from recirculating through the drive unit 3. As shown in the drawing, the flow passage part 320 extends to be inclined upward from the filter body 310 to the discharge hole 322. Therefore, foreign substances contained in oil that has passed through the filter body 310 can be induced to move toward the filter body 310 due to their own weights.

As such, because the filter unit 300 is formed to be inclined relative to the rear housing 100, movement of foreign substances, contained in oil can be restricted as much as possible. Thus, oil and foreign substances that are contained in refrigerant can be reliably separated from each other, whereby the operation efficiency of the electric compressor 1 can be enhanced.

The foreign substance storage part 210 is disposed below of the filter unit 300. The reason why the foreign substance storage part 210 is disposed at the above-mentioned position is to restrict foreign substances stored in the foreign substance storage part 210 from moving to the drive unit 3 through the filter unit 300 and thus enhance the reliability and efficiency in operation of the electric compressor 1.

For example, if the foreign substance storage part 210 is disposed above the filter unit 300, a small amount of foreign substances may be more easily moved to the filter unit 300. However, as shown in the drawings, in the case where the foreign substance storage part 210 is disposed below the filter unit 300 at a position spaced apart from the filter unit 300 with a predetermined height difference therebetween, the length of a path along which the foreign substances move to the filter unit 300 is increased, whereby the amount of foreign substances moved to the drive unit 3 can be minimized, and components can be arranged in an optimal layout in a limited region of the rear housing 100.

Figure 4:
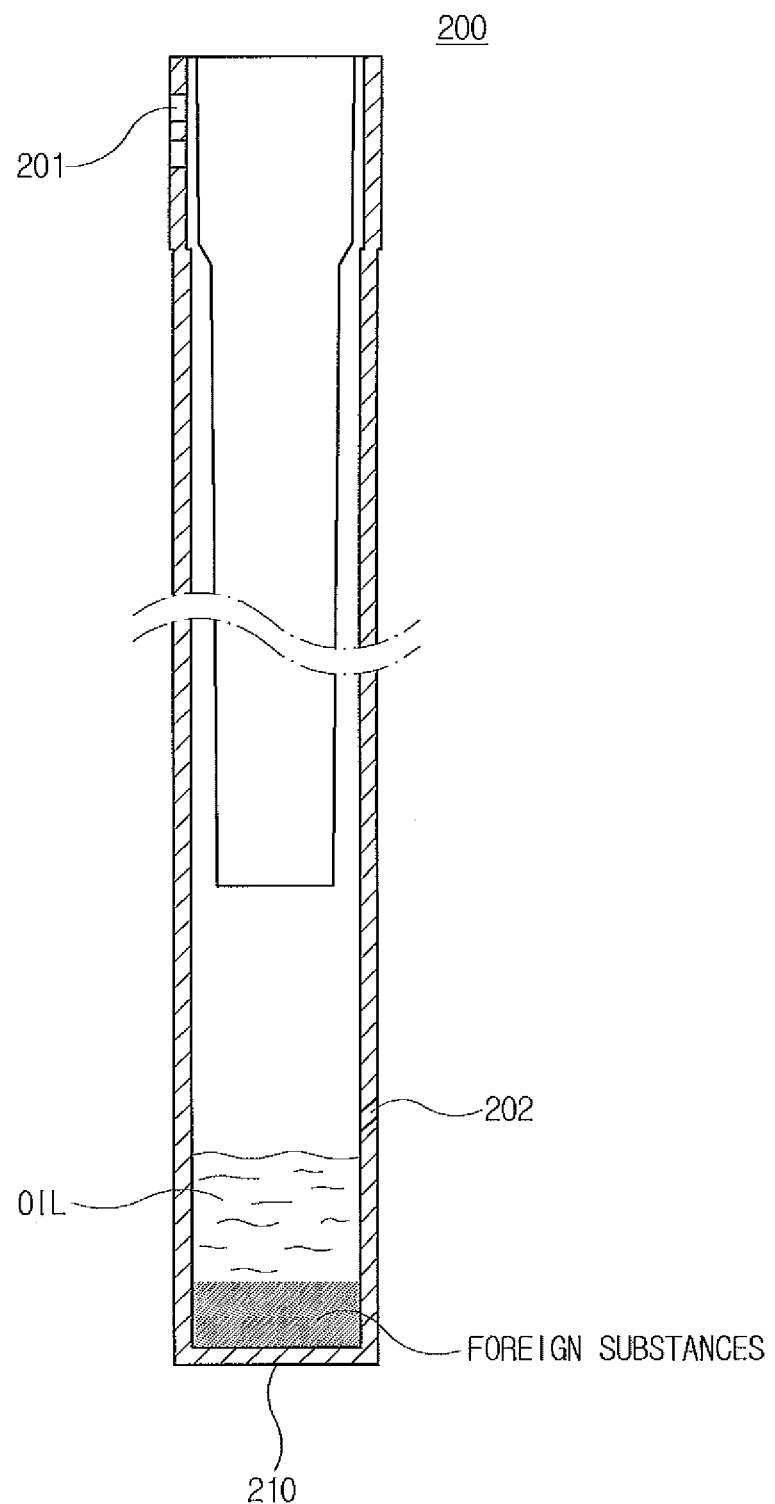
FIG. 4 is a longitudinal sectional view illustrating another example of the oil separator according to the first embodiment of the present invention.

For this, referring to FIGS. 3 and 4, when seen in a longitudinal sectional view, the foreign substance storage part 210 may have either a conical cross-section or a rectangular cross-section. Although the cross-sectional shape can be changed into various forms depending on the shape of a machine tool (not shown) for machining the foreign substance storage part 210, it is preferable that any one of the above-mentioned shapes be selected on the assumption that the foreign substance storage part 210 is formed by the most typical drilling operation.

The oil separator 200 further includes the opening 202 formed to allow oil, which exceeds a storage capacity of the foreign substance storage part 210 and overflows it, to move toward the filter unit 300. To prevent even a small amount of foreign substance pieces, which may move to the filter unit 300, from passing through the opening 202, the opening 202 extends to be inclined upward from the inside of the oil separator 200 to the outside. Therefore, even when foreign substances are moved to the opening 202, they can be maximally restricted from moving to the filter unit 300. Although the angle at which the opening 202 is inclined is not limited to a specific value, it is preferable that the angle be at least 30degrees or more.

When it is assumed that the radius of the rear housing 100 is R, the foreign substance storage part 210 is disposed at a position spaced apart from the upper end of the oil separator 200 by $2/3*R$ or more. Because the oil separator 200 is disposed in the rear housing 100, the foreign substance storage part 210 is formed at a position below the center of the rear housing 100 that is spaced apart from the uppermost end of the oil separator 200 by a predetermined distance.

The reason why the foreign substance storage part 210 is disposed at the above-mentioned position is as follows. Due to the fact that oil separated from refrigerant in the oil separator 200 has to circulate through the drive unit 3 so as to ensure the reliable operation of the electric compressor 1, when the foreign substance storage part 210 is disposed in a central lower portion of the rear housing 100 which corresponds to a position relatively lower than a central upper portion of the rear housing 100 based on the longitudinal direction of the oil separator 200, it is advantageous for preventing foreign substances from circulating toward the drive unit 3.

The foreign substance storage part 210 is formed such that the diameter thereof is reduced downward. Although the angle at which the diameter of the foreign substance storage part 210 is reduced is not limited to a specific value, when the angle corresponds to that shown in the drawing or is maintained at a relatively small angle, a phenomenon in which foreign substances move upward based on the longitudinal direction of the oil separator 200 can be minimized.

Figure 5:
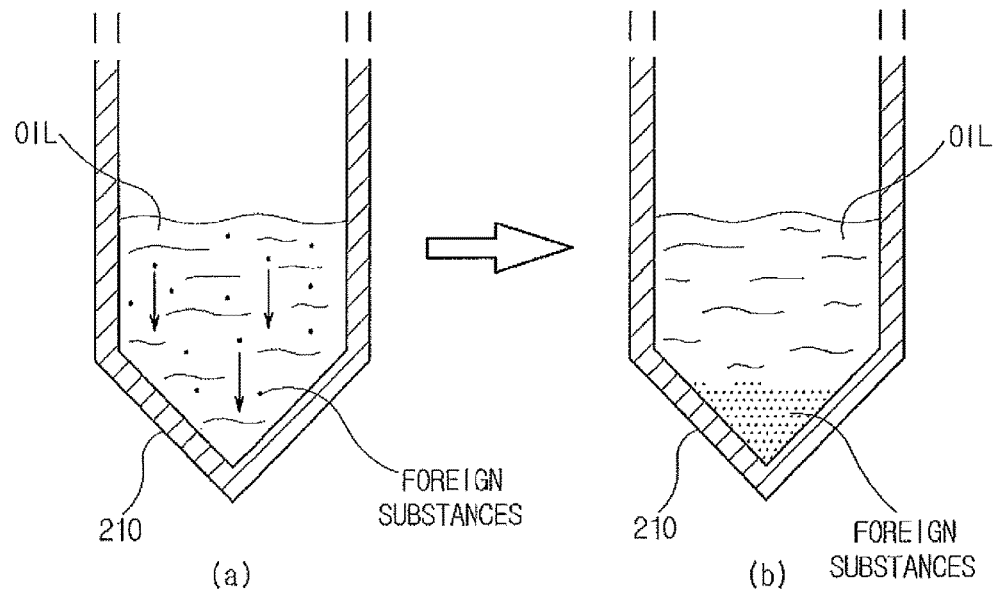
FIG. 5 is a view showing the operation of the oil separator according to the first embodiment of the present invention.
Figure 6:
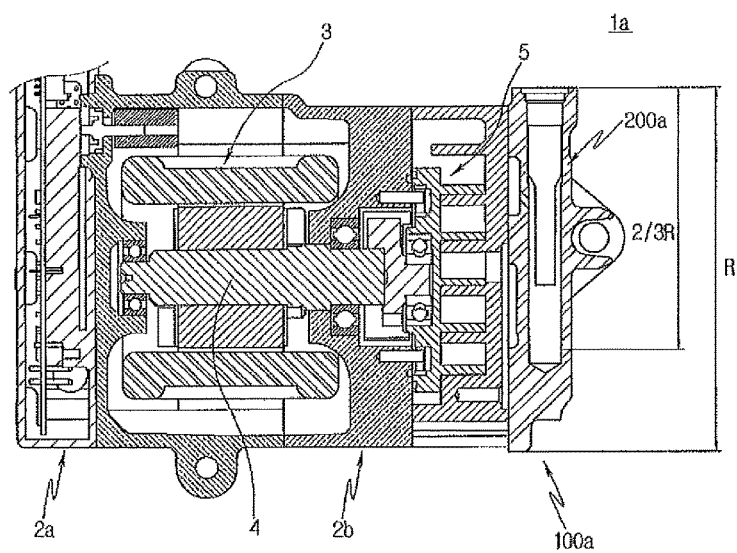
FIG. 6 is a longitudinal sectional view illustrating an electric compressor according to a second embodiment of the present invention.
Figure 7:
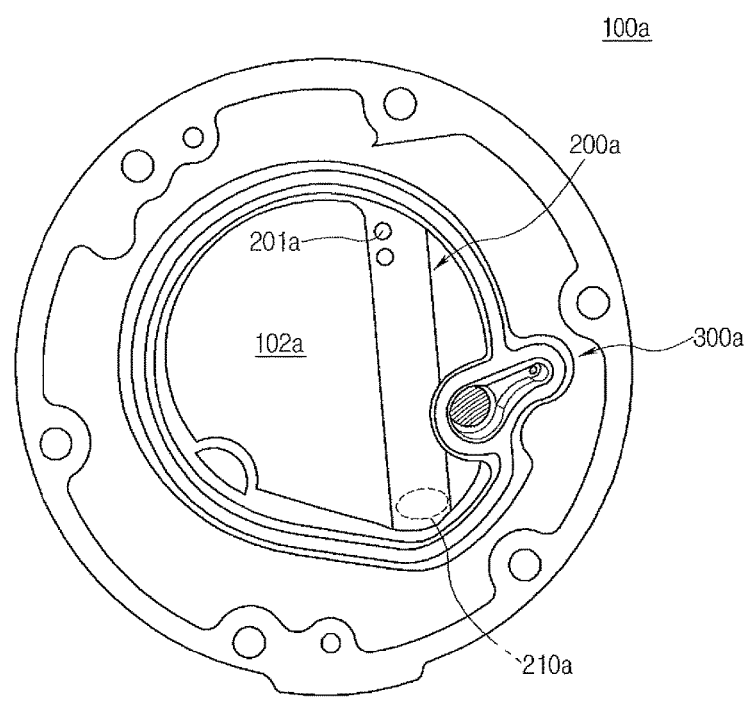
FIG. 7 is a view illustrating an oil separator provided in a rear housing according to the second embodiment of the present invention.
Figure 8:
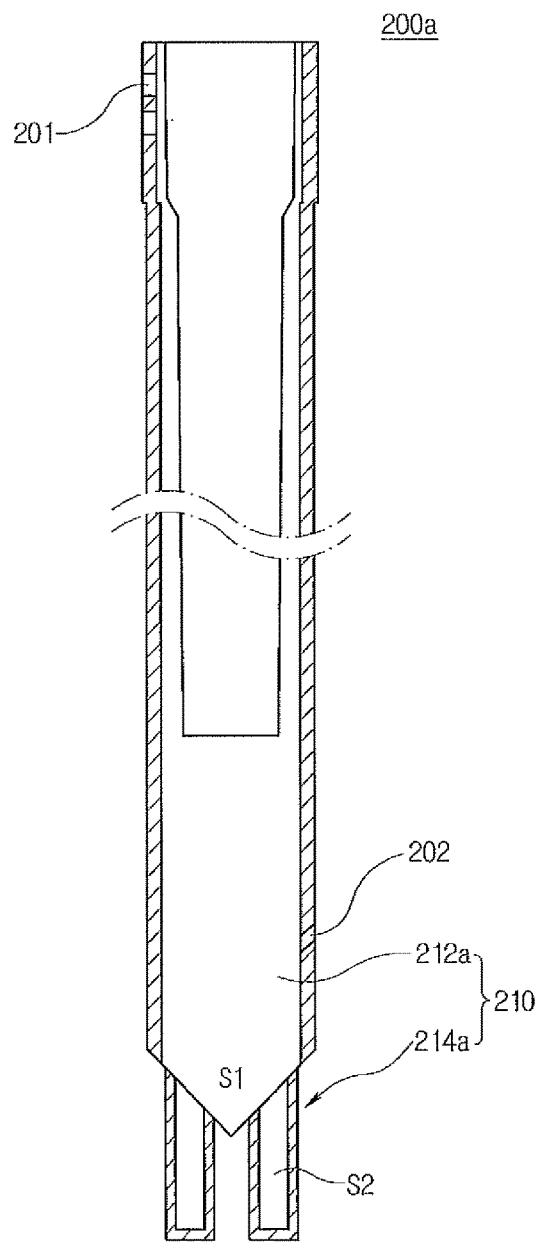
FIG. 8 is a longitudinal sectional view of the oil separator having a foreign substance storage part according to the second embodiment of the present invention.
Figure 9:
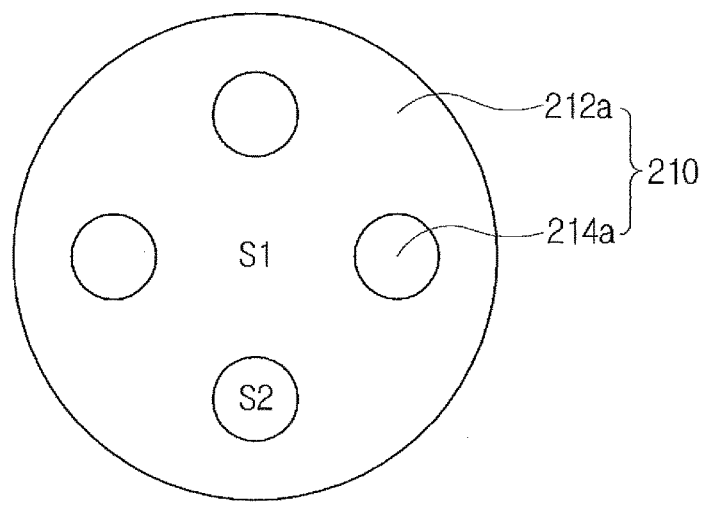
FIG. 9 is a cross sectional view of the oil separator according to the second embodiment of the present invention.

Referring to FIG. 5, the surface roughness of an inner circumferential surface of the foreign substance storage part 210 is preferably higher than that of a section from an inside of the refrigerant inlet hole 201 to the foreign substance storage part 210. With regard to the foreign substance storage part 210, foreign substances which are generated at the initial stage of the operation of the electric compressor 1 are moved toward the foreign substance storage part 210 via the refrigerant inlet hole 201 with oil mixed therewith.

After a predetermined time has passed, a comparatively large amount of foreign substances are collected and maintained in the foreign substance storage part 210. Because of the high surface roughness of the inner surface of the foreign substance storage part 210, the foreign substances can be stably retained in the foreign substance storage part 210 rather than moving upward from the foreign substance storage part 210 due to a pressure change resulting from discharge of refrigerant.

In this way, foreign substances are stored in the foreign substance storage part 210, so that an abrasion phenomenon due to direct friction with the drive unit 3 or the internal components of the electric compressor 1 can be prevented, whereby the reliability and efficiency in operation of the electric compressor 1 can be improved.

The foreign substance storage part 210 is formed through a drilling process, and detailed description of manufacturing and machining the rear housing 100 will be given later herein.

Hereinafter, an electric compressor according to a second embodiment of the present invention will be described with reference to the related drawings. The present embodiment is characterized in that unlike the preceding embodiment, a plurality of foreign substance storage parts 210*a* are formed so that a larger amount of foreign substances can be collected.

Referring to FIGS. 6 to 9, the electric compressor 1*a* according to the present embodiment includes: a rear housing 100*a* having a discharge chamber 102*a* through which refrigerant is discharged; and an oil separator 200*a* which is disposed in the discharge chamber 102*a* and has a refrigerant inlet hole 201*a* through which refrigerant is drawn into the oil separator 200*a*, and a plurality of foreign substance storage parts 210 each of which stores therein foreign substances contained in the refrigerant drawn through the refrigerant inlet hole 201*a*.

The foreign substance storage part 210 includes a first foreign substance storage part 212*a* which is formed in a lower end of the oil separator 200*a*, and a second foreign substance storage part 214*a* which is open downward on a bottom of the first foreign substance storage part 212*a*. The first foreign substance storage part 212*a* has a diameter equal or similar to that of the oil separator 200*a* and is formed in the lower end of the oil separator 200*a*. The second foreign substance storage part 214*a* has a diameter smaller than that of the first foreign substance storage part 212*a*.

Furthermore, the first foreign substance storage part 212*a* and the second foreign substance storage part 214*a* have different areas so that the amounts of foreign substances collected therein also differ from each other.

The second foreign substance storage part 214*a* comprises a plurality of second foreign substance storage parts 214*a* which are circumferentially arranged around a center of the bottom of the first foreign substance storage part 212*a*. Although the number of second foreign substance storage parts 214*a* and the intervals at which the second foreign substance storage parts 214*a* are spaced apart from each other are not limited, they may be changed in various configurations as well as the configuration illustrated in the drawings.

For instance, after the bottom of the first foreign substance storage part 212*a* is sectioned into a plurality of identical regions, the second foreign substance storage parts 214*a* are arranged in the sectioned regions at positions spaced apart from each other at regular intervals. Thereby, a phenomenon, in which foreign substances are focused into only a second foreign substance storage part 214*a* that is disposed at a specific position, can be prevented.

The second foreign substance storage part 214*a* is open with a diameter smaller than that of the first foreign substance storage part 212*a*. Furthermore, the second foreign substance storage part 214*a* extends longer than the first foreign substance storage part 212*a*. The reason why the diameter of the second foreign substance storage part 214*a* is comparatively small is due to the fact that after foreign substances generated at the initial stage of the operation of the electric compressor 1*a* are collected in the second foreign substance storage part 214*a*, the foreign substances can be easily maintained in the collected state so that a phenomenon in which the foreign substances are moved upward from the lower end of the interior of the oil separator 200*a* can be minimized.

Furthermore, because the second foreign substance storage part 214*a* extends longer than the first foreign substance storage part 212*a*, the foreign substances that have been drawn into the second foreign substance storage part 214*a* cannot be easily moved to the first foreign substance storage part 212*a*. Thus, the foreign substances that have been collected in the second foreign substance storage part 214*a* can be stably maintained in a separated state in the second foreign substance storage part 214*a*.

Therefore, the foreign substance separation efficiency of the oil separator 200*a* can be enhanced, whereby the compression efficiency and durability of the electric compressor 1*a* can be maintained constant.

The diameter of the first foreign substance storage part 212*a* is reduced toward the second foreign substance storage part 214*a*. Although the angle at which the diameter of the first foreign substance storage part 212*a* is reduced is not limited to a specific value, when the angle corresponds to that shown in the drawing or is maintained at a relatively small angle, a phenomenon in which foreign substances move upward based on the longitudinal direction of the oil separator 200*a* can be minimized.

When it is assumed that a storage region defined in the first foreign substance storage part 212*a* refers to a first storage region S1 while a storage region defined in the second foreign substance storage part 214a refers to a second storage region S2, the first and second substance storage parts 212a and 214a are formed such that the first storage region S1 is larger than the second storage region S2.

The first storage region S1 is a region into which foreign substances are first drawn. To make a small amount of foreign substances be smoothly drawn into the first storage region S1 toward the second storage region S2, it is preferable that the area of the first storage region S1 be comparatively large to enable foreign substances to easily move. Given this, the first and second substance storage parts 212a and 214a should be formed in the above-mentioned manner.

The electric compressor 1a further include a filter unit 300a which is disposed on a side of the oil separator 200a so as to filter out foreign substances from refrigerant. The foreign substance storage part 210 is disposed below the filter unit 300a. The reason why the foreign substance storage part 210 is disposed at the above-mentioned position is to restrict foreign substances stored in the foreign substance storage part 210a from moving to the drive unit 3 through the filter unit 300a and thus enhance the reliability and efficiency in operation of the electric compressor 1a.

For example, if the foreign substance storage part 210 is disposed above the filter unit 300a, a small amount of foreign substances may be more easily moved to the filter unit 300a. However, as shown in the drawings, in the case where the foreign substance storage part 210 is disposed below the filter unit 300a at a position spaced apart from the filter unit 300a with a predetermined height difference therebetween, the length of a path along which the foreign substances move to the filter unit 300a is increased, whereby the amount of foreign substances moved to the drive unit 3 can be minimized.

Figure 10:
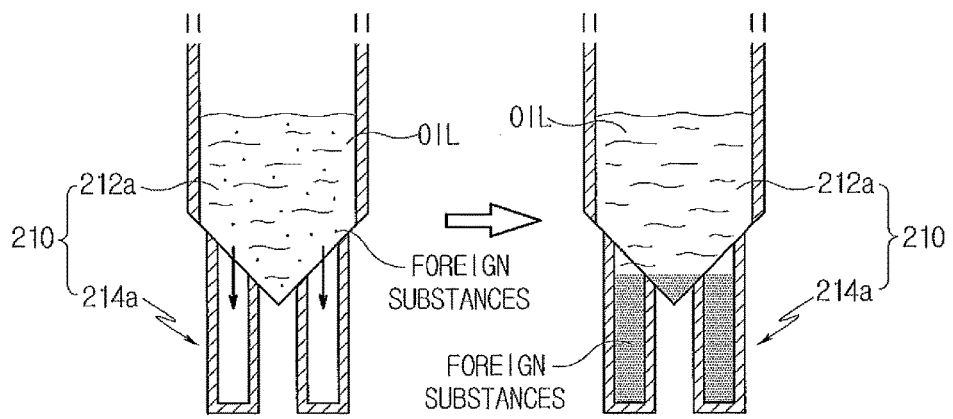
FIG. 10 is a view showing the operation of the oil separator according to the second embodiment of the present invention.

Referring to FIG. 10, the reason why the diameters of the first and second foreign substance storage parts 212a and 214a differ from each other is to enhance the efficiency of collecting foreign substances. For instance, foreign substances generated at the initial stage of the operation of the electric compressor 1a are moved to the second foreign substance storage parts 214a via the first foreign substance storage part 212a, and are first collected in the second foreign substance storage parts 214a.

After foreign substances are collected and charged in all of the second foreign substance storage parts 214a, extra foreign substances that has been not yet collected in the foreign substance storage parts 214a are collected in the first foreign substance storage part 212a and maintained therein. Therefore, the amount of foreign substances that are removed out of the foreign substance storage part 210 can be minimized, whereby a phenomenon in which foreign substances are moved to the drive unit 3 can be prevented. Consequently, the operation efficiency of the electric compressor 1 can be enhanced, and malfunction or noise caused by unnecessary abrasion can be minimized.

Hereinafter, an electric compressor according to a third embodiment of the present invention will be described with reference to the related drawings. The present embodiment has a similar main configuration to that of the above-mentioned second embodiment but is characterized in that the position of a second foreign substance storage part relative to a first foreign substance storage part is limited to a specific position.

Figure 11:
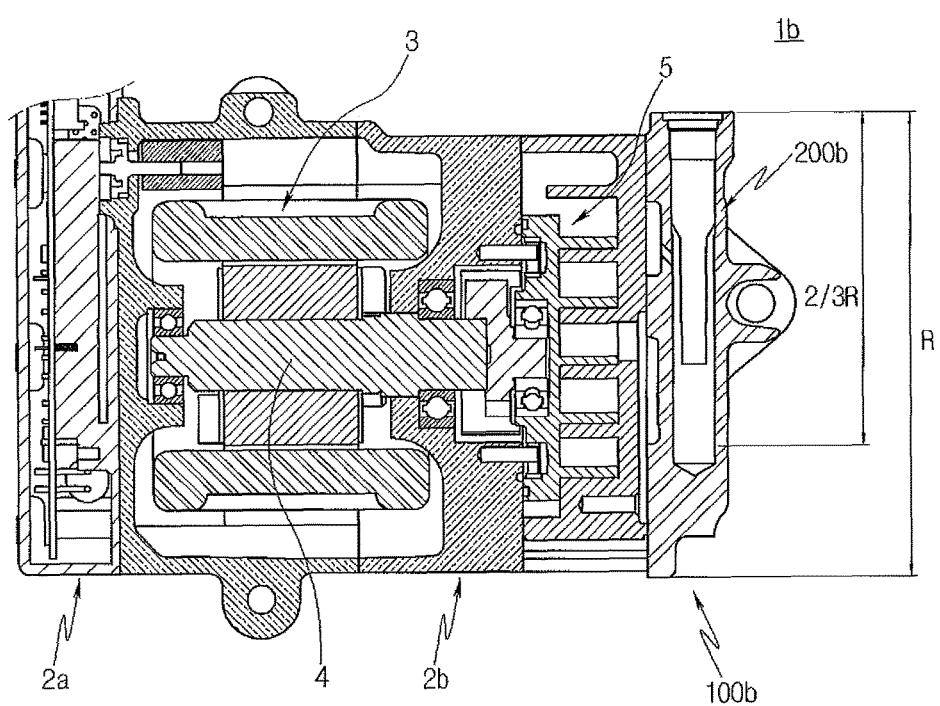
FIG. 11 is a longitudinal sectional view illustrating an electric compressor according to a third embodiment of the present invention.
Figure 12:
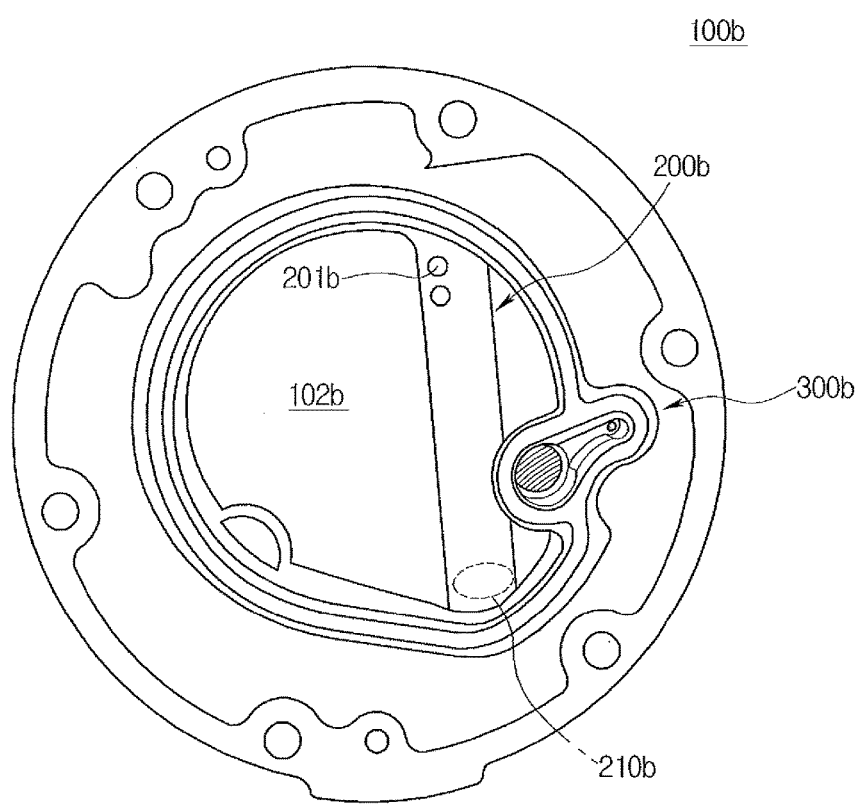
FIG. 12 is a view illustrating an oil separator provided in a rear housing according to the third embodiment of the present invention.
Figure 13:
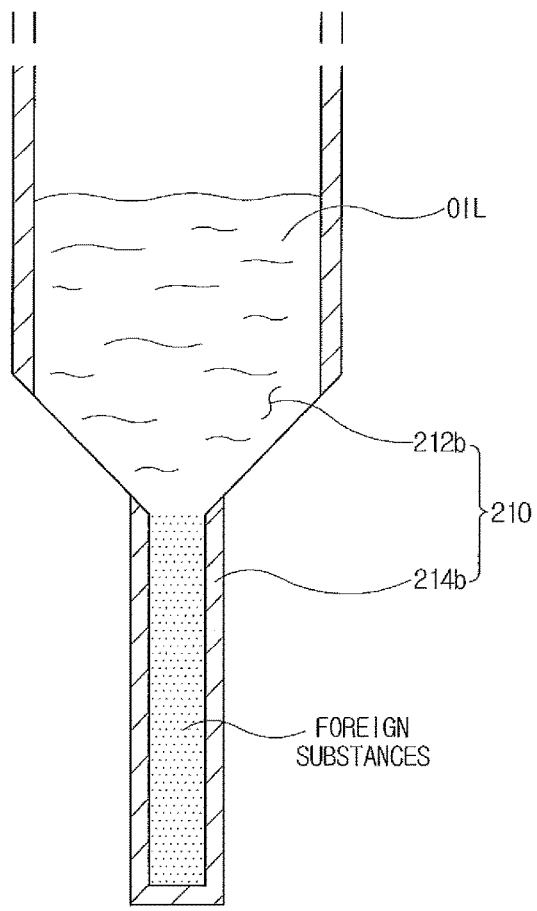
FIG. 13 is a longitudinal sectional view illustrating the electric compressor according to the third embodiment of the present invention.

Referring to FIGS. 11 to 13, the electric compressor 1b according to the present embodiment includes: a rear housing 100b having a discharge chamber 102b through which refrigerant is discharged; and an oil separator 200b which is disposed in the discharge chamber 102b and has a refrigerant inlet hole 201b through which refrigerant is drawn into the oil separator 200b, and a foreign substance storage part 210 which stores therein foreign substances contained in the refrigerant drawn through the refrigerant inlet hole 201b. The foreign substance storage part 210 includes a first substance storage part 212b which is formed in a lower end of the oil separator 200b, and a second foreign substance storage part 214b which is open downward on a central portion of a bottom of the first foreign substance storage part 212b with a diameter smaller than that of the first foreign substance storage part 212b.

The first foreign substance storage part 212b extends such that the diameter thereof is reduced toward the second foreign substance storage part 214b. With regard to the extent to which the diameter is reduced, the diameter of a lower end of the first foreign substance storage part 212b may be reduced less than ½ of the diameter of an upper end thereof. The second foreign substance storage part 214b extends downward in a longitudinal direction with a constant diameter and is longer than the first foreign substance storage part 212b.

As such, in the case where the longitudinal length of the second foreign substance storage part 214b is comparatively long, it becomes difficult for foreign substances, which have been moved from the first foreign substance storage part 212b into the second foreign substance storage part 214b, to move upward to an upper region of the first foreign substance storage part 212b. Therefore, the foreign substances can be stored in a separated state in the second foreign substance storage part 214b.

The electric compressor 1b further includes a filter unit 300b which is disposed on a side of the oil separator 200b so as to filter out foreign substances from refrigerant. The foreign substance storage part 210 is disposed below the filter unit 300b. The reason why the foreign substance storage part 210 is disposed at the above-mentioned position is to restrict foreign substances stored in the foreign substance storage part 210 from moving to the drive unit 3 through the filter unit 300b and thus enhance the reliability and efficiency in operation of the electric compressor 1b.

For example, if the foreign substance storage part 210 is disposed above the filter unit 300b, a small amount of foreign substances may be more easily moved to the filter unit 300b. However, as shown in the drawings, in the case where the foreign substance storage part 210 is disposed below the filter unit 300b at a position spaced apart from the filter unit 300b with a predetermined height difference therebetween, the length of a path along which the foreign substances move to the filter unit 300b is increased, whereby the amount of foreign substances moved to the drive unit 3 can be minimized.

A method of machining an electric compressor according to an embodiment of the present invention will be described with reference to the attached drawings.

Figure 14:
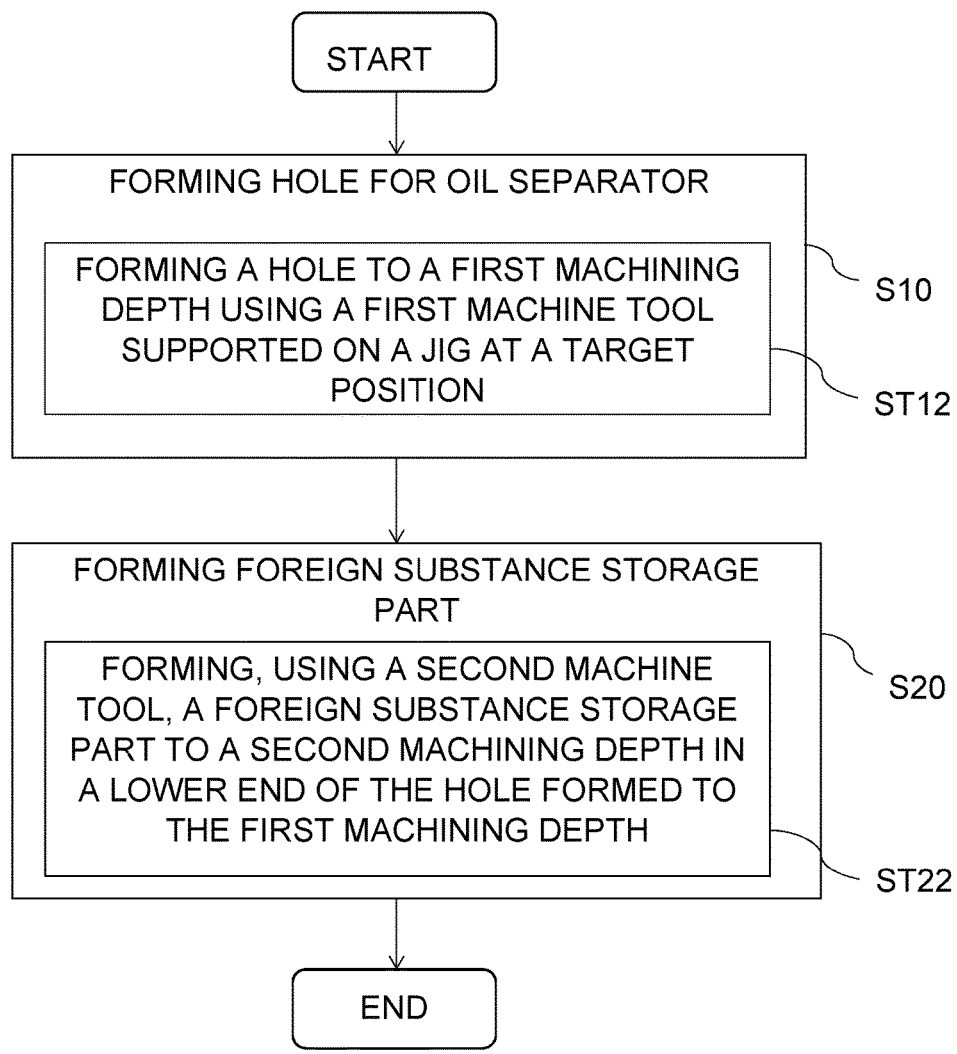
FIG. 14 is a flowchart showing a method of forming an oil separator of an electric compressor according to an embodiment of the present invention.
Figure 15:
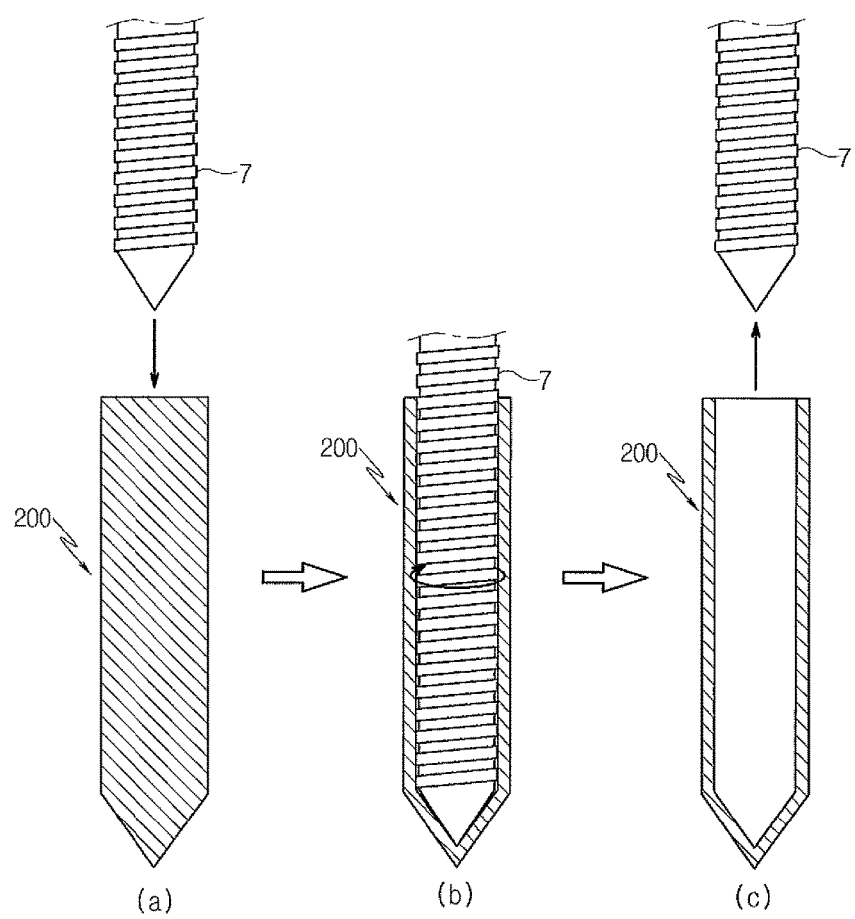
FIG. 15 is a view illustrating one example of a process of forming the oil separator according to the present invention.

Referring to FIGS. 14 to 15, the description of the method of machining the electric compressor according to the embodiment of the present invention is limited to that of the oil separator of the rear housing, in more detail, only a method of machining the foreign substance storage part formed in the lower end of the oil separator will be described.

The method according to the embodiment of the present invention includes: a hole forming step S10 of moving a machine tool to a target position at which an oil separator is formed in a rear housing supported on a support jig (not shown), and forming a hole for the oil separator; and a step S20 of forming, after the forming of the hole for oil separator has been completed, a foreign substance storage part for collecting foreign substances in a lower end of the oil separator.

The rear housing supported on the support jig may be manufactured by a die casting method or other machining methods. For example, in the case where the rear housing is manufactured by the die casting method, a separate slide pin (not shown) is installed at a position at which the oil separator and the foreign substance storage part are formed, such that liquid molten metal is prevented from being injected into a space corresponding to the oil separator and the foreign substance storage part. In this way, the oil separator and the foreign substance storage part may be formed.

Alternatively, the oil separator and the foreign substance storage part are formed using a separate machine tool. The machine tool may be a drilling machine or a machine tool having a similar function. In an embodiment, a drilling machine is used as the machine tool. A drill having a predetermined diameter is used as a tool for forming the oil separator and the foreign substance storage part.

The drill may have a conical or rectangular cross-sectional shape. Depending on the shape of the end of the drill, the cross-sectional shape of the foreign substance storage part can be changed.

The hole forming step S10 and the foreign substance storage part forming step S20 may be conducted using the machine tool at the same time. In this case, before performing a machining operation, a worker inputs data such that the drill which refers to the machine tool is moved to a depth to which a foreign substance storage part is formed. Subsequently, the operation of forming the oil separator and the foreign substance storage part is performed.

In the case where the machining operation is conducted in the above-mentioned way, the operation of forming the foreign substance storage part can be performed at the same time with the operation of forming the oil separator. Therefore, the work efficiency can be enhanced, and the time required for work is reduced. In addition, because a machining tolerance can be minimized, precise machining is possible.

Unlike this, the hole forming step S10 may include step ST12 of forming a hole to a first machining depth using a first machine tool, and the foreign substance storage part forming step S20 may include step ST22 of forming, using a second machine tool, a foreign substance storage part to a second machining depth in a lower end of the hole formed to the first machining depth. In this case, the hole formed to the first machining depth and the foreign substance storage part formed to the second machining depth may be respectively formed by different machine tools.

In this case, the step (ST22) of forming the foreign substance storage part to the second machining depth may be conducted such that the surface roughness of the foreign substance storage part is greater than that of the hole formed to the first machining depth at the step (ST12). Consequently, foreign substances can be more stably maintained in a state in which they are attached to the surface of the foreign substance storage part, whereby a phenomenon, in which foreign substances that have been moved into the foreign substance storage part move out of the foreign substance storage part, can be minimized.

INDUSTRIAL APPLICABILITY

The present invention relates to an electric compressor and, more particularly, to an electric compressor which is configured such that foreign substances can be reliably separated from refrigerant so as to promote reliable operation of the electric compressor, and a method of forming an oil separator of the electric compressor.

The invention claimed is:

1. An electric compressor comprising:
a housing having a discharge chamber formed therein, the discharge chamber configured to receive a refrigerant therein;
an oil separator disposed in the discharge chamber, wherein the oil separator is an oil separator housing defining a chamber separate from the discharge chamber, the oil separator including a refrigerant inlet hole configured to convey the refrigerant from the discharge chamber to the oil separator, a foreign substance storage part configured to store foreign substances contained in the refrigerant conveyed through the refrigerant inlet hole, and an opening configured to convey an oil separated from the refrigerant from the oil separator, wherein the foreign substance storage part is formed in a lower end of the oil separator; and
a filter unit disposed in the housing in a space exterior to the oil separator housing for filtering the foreign substances contained in the refrigerant, wherein the foreign substance storage part is disposed lower than the filter unit, and wherein the opening directly connects the oil separator to the filter unit and conveys the oil overflowing the foreign substance storage part from the oil separator to the filter unit.

2. The electric compressor of claim 1, wherein the foreign substance storage part has one of a conical cross-sectional shape and rectangular cross-section shape.

3. The electric compressor of claim 1, wherein the housing has a rear housing formed therein, the rear housing has a radius and the foreign substance storage part is spaced from an upper end of the oil separator at a distance one of equal to and greater than ⅔ of the radius of the rear housing.

4. The electric compressor of claim 1, wherein a diameter of the foreign substance storage part decreases as a distance from the refrigerant inlet hole increases.

5. The electric compressor of claim 1, wherein a first section of the oil separator includes the foreign substance storage part and a second section of the oil separator extends from the refrigerant inlet hole to the foreign substance storage part, a surface roughness of an inner circumferential surface of the first section is greater than a surface roughness of an inner circumferential surface of the second section.

6. The electric compressor of claim 1, wherein the filter unit is inclined relative to a rear housing formed in the housing.

7. The electric compressor of claim 1, wherein the opening is inclined from an inner surface of the oil separator towards an outer surface of the oil separator.

8. The electric compressor of claim 7, wherein the filter unit includes:
a filter body disposed adjacent the opening; and
a flow passage part conveying the oil from the filter body to a discharge hole, the discharge hole formed in an end of the flow passage part.

9. The electric compressor of claim 8, wherein the filter body is disposed lower than the flow passage part.

10. The electric compressor of claim 1, wherein the oil separator includes a plurality of the foreign substance storage parts formed therein.

11. The electric compressor of claim 1, wherein the foreign substance storage part includes:

a first foreign substance storage part portion formed in the lower end of the oil separator; and a second foreign substance storage part portion extending outwardly from a bottom of the first foreign substance storage part portion.

12. The electric compressor of claim 11, wherein the foreign substance storage part includes a plurality of the second foreign substance storage part portions circumferentially arranged about a center of the bottom of the first foreign substance storage part portion.

13. The electric compressor of claim 11, wherein the second foreign substance storage part portion has a diameter smaller than a diameter of the first foreign substance storage part portion.

14. The electric compressor of claim 11, wherein the second foreign substance storage part portion has a length greater than a length of the first foreign substance storage part portion.

15. The electric compressor of claim 11, wherein a diameter of the first foreign substance storage part portion decreases towards the second foreign substance storage part portion.

16. The electric compressor of claim 11, wherein the first foreign substance storage part portion includes a first storage region configured to contain the foreign substances and the second foreign substance storage part portion includes a second storage region configured to contain the foreign substances, a cross-sectional area of the first storage region is larger than a cross-sectional area of the second storage region.

* * * * *